United States Patent [19]
Barrett

[11] 3,859,194
[45] Jan. 7, 1975

[54] ELECTRODEPOSITION APPARATUS

[75] Inventor: Frederick Barrett, Wirral, England

[73] Assignee: The Electricity Council, London, England

[22] Filed: Feb. 13, 1974

[21] Appl. No.: 442,020

Related U.S. Application Data

[62] Division of Ser. No. 243,390, April 12, 1972, Pat. No. 3,817,843.

[30] Foreign Application Priority Data

Apr. 13, 1971   Great Britain ..................... 9236/71

[52] U.S. Cl. ................................. 204/208, 204/274
[51] Int. Cl. ....... C23b 7/04, C23b 5/68, B01k 3/00
[58] Field of Search ............ 204/13, 208, 216, 274, 204/272

[56] References Cited
UNITED STATES PATENTS

| | | |
|---|---|---|
| 2,515,614 | 7/1950 | Schumaker ........................ 204/274 |
| 2,587,630 | 3/1952 | Konrad et al. ........................ 204/13 |
| 2,865,830 | 12/1958 | Zoldas ................................ 204/208 |
| 3,151,048 | 9/1964 | Conley et al. ........................ 204/13 |
| 3,461,046 | 8/1969 | Clancy ............................. 204/216 X |
| 3,674,656 | 4/1972 | Yates ............................... 204/208 X |
| 3,767,537 | 10/1973 | Selker ............................. 204/208 X |

*Primary Examiner*—F. C. Edmundson

[57] ABSTRACT

An electrodeposition apparatus for making foil includes a drum cathode with a titanium cathode surface uniformly spaced from a carbon anode; electrolyte flows between the cathode and anode under substantially streamline conditions so as to keep the anolyte and catholyte separated; heaters are mounted inside the cathode; and P.T.F.E. sealing strips bearing on the edge portions of the cathode surface enable the stripped foil to have acceptable edges not requiring a trimming operation.

6 Claims, 1 Drawing Figure

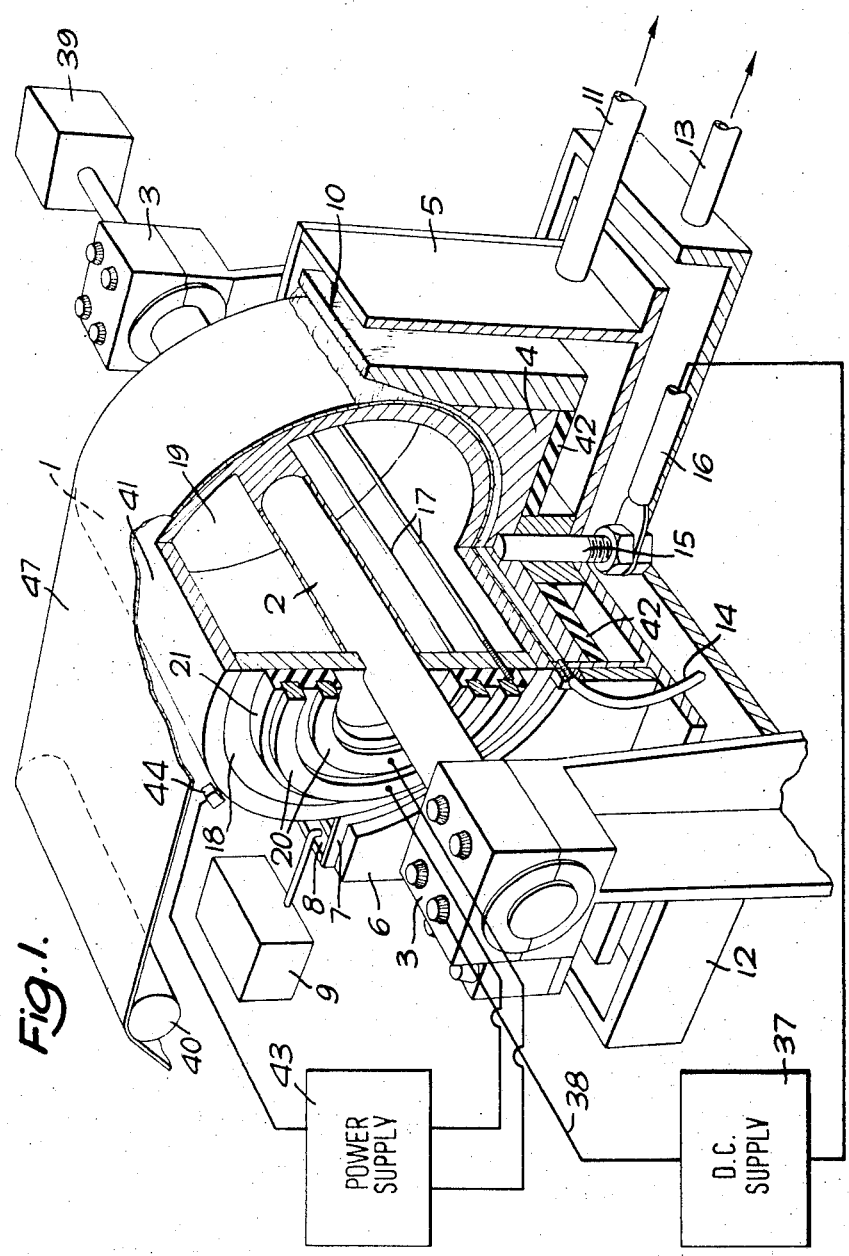

ELECTRODEPOSITION APPARATUS

This application is a division of my prior U.S. application Ser. No. 243,390 filed Apr. 12, 1972, now U.S. Pat. No. 3,817,843.

BACKGROUND OF THE INVENTION

This invention relates to an electrodeposition apparatus.

It is known, e.g. from British Pat. No. 1,251,650, to produce iron foil on a moving cathode by electrolysis of an electrolyte and to strip the foil from the cathode. The temperature of the electrolyte becomes raised due to the effect of the electrolyzing current, and the electrolyte may be intentionally heated to increase its conductivity, and to improve the ductility of the deposited foil.

In an apparatus for carrying out such a method the stripping point is above the electrolyte level and heat loss from the cathode region not in contact with hot electrolyte may result in a non-uniform cathode temperature and consequently the deposited foil may have non-uniform characteristics.

SUMMARY

This invention provides an electrodeposition apparatus for making foil, the apparatus comprising a drum cathode arranged for rotation about a horizontal axis and having its cylindrical surface formed of titanium, a carbon anode having its operative surface uniformly spaced from the cylindrical surface of the cathode and extending around a portion thereof thereby forming an arcuate gap, means for maintaining a uniform rate of laminar flow of electrolyte around the arcuate gap between the anode and the cathode, means for rotating the drum cathode at a uniform rate, sensing means arranged to provide in use an output indicative of the temperature of the non-immersed portion of the titanium surface adjacent entry into the electrolyte, heating means responsive to the output of the sensing means for heating the drum cathode to maintain the sensed temperature at a predetermined value, means for maintaining an electrolyte at a predetermined temperature, a source of electrical current connected to the anode and cathode and being arranged to supply a predetermined electrolyzing current, means for maintaining the temperature of the anode at a predetermined value, and means for stripping the deposited foil from the cathode.

Titanium is selected as the material of the cathode surface, since this permits the use of an electrolyte having a low value of pH. With a low pH a ferrous chloride electrolyte is more conductive, the cathode efficiency is high (i.e., production of $H_2$ at the cathode is low), ferric salts are prevented from precipitating out of solution, and the deposited foil tends to be more ductile.

In prior apparatuses it has been necessary to use diaphragms, etc., to avoid mixing of anolyte and cathode. With the present apparatus the electrolyte flow rate enables substantially laminar flow to be obtained, thus maintaining the required separation without the use of a diaphragm.

The anode temperature is prevented from becoming so low as to chill the electrolyte and precipitate the dissolved salts.

The electrodeposition apparatus may have means engaging the cathode surface so as to delineate the width of foil deposited on the cathode. By this means it is possible to confine the deposition of foil so that trimming of the foil edges after stripping is unnecessary.

The cathode may be in the form of a titanium sleeve mounted on a support formed of a plurality of spaced-apart coaxial discs. The initial cost of a cathode can be reduced thereby, replacement of the sleeve is both facilitated and results in a lower cost than replacement of a complete cathode, and it is preferable to use a support having known or good electrical conductivity.

DESCRIPTION OF THE DRAWINGS

The drawing shows a part schematic/part cutaway view of a cell having a cylindrical cathode.

DETAILED DESCRIPTION

In the drawing a cylindrical cathode 1 comprising a titanium sleeve 41 mounted on end plates 18, 19 is mounted on an electrically conducting shaft 2. The shaft 2 is mounted in trunnions 3 which are designed to provide the necessary electrical connection between a D.C. supply 37 and the shaft 2. The power supply 37 is arranged to maintain the electrolyzing current at a predetermined value. Situated underneath the cathode is a carbon anode 4, having a curved surface concentric with and uniformly spaced from the surface of cathode 1. The spacing is made small, about 1.0 cms, to keep the resistance of the cell low, and the angle subtended by arcuate surface of the anode is approximately 160°.

An assembly box 5 with side cheeks 6 surrounds the anode and cathode. The side cheeks have an arcuate cut-out concentric with the cathode and of about the same radius as the arcuate surface of the anode 4. Pieces of flexible material (polytetrafluoroethylene) are situated inside each cheek 6, bearing on the edge portions of the cathode surface to form rubbing seals 7. These seals restrict deposition of the foil to a width just less than that of the cathode surface. By preventing the foil from being deposited at and around the cathode edge, the edges of the stripped foil do not require to be trimmed.

An one side of the assembly box is a header tank 8 to which an electrolyte (ferrous chloride solution) is fed having been first prepared and held at normal operating temperature in a temperature controlled tank 9. At the opposite side of the anode to the header tank is a weir 10 which is adjustable in height such that the flow of electrolyte between anode and cathode can be altered. The anolyte and catholyte flows are substantially separated by streamline flow and centrifugal force. The spill from the weir is taken via pipe 11 back to the tank 9 and any leakage past the rubbing seals 7 is caught in a catch tray 12 and taken back to tank 9 via pipe 13. A drain pipe 14 is provided so that the electrolyte can be emptied from between the anode and cathode.

The cathode is connected to the D.C. power supply via a cable 38 connected to the trunnion mounts, and the anode is connected to the power supply by means of a stud 15 and a cable 16.

Insulation 42 is provided under the anode 4 to prevent the anode temperature from becoming so low as to chill the electrolyte.

A number of heaters 17 are mounted between end plates 18, 19 of the cathode. The heaters are connected via slip rings 20 to a power supply 43 which, to maintain a predetermined cathode temperature, regulates the supply of power to the heaters in dependence on the output of temperature sensor 44 in contact with the cathode surface. The slip rings are mounted on an insulating annulus 21 attached to end plate 18.

Protective covers (not shown) are fitted over the header tank and the weir to minimise vapour loss from the electrolyte.

The cathode is slowly rotated by a motor 39 and the metal foil is stripped from the cathode continuously and wound onto reel 40.

We claim:

1. An electrodeposition apparatus comprising a drum cathode arranged for rotation about a horizontal axis and having its cylindrical surface formed of titanium, a carbon anode having its operative surface uniformly spaced from the cylindrical surface of the cathode and extending around a portion thereof thereby forming an arcuate gap, means for maintaining a uniform rate of laminar flow of electrolyte around the arcuate gap between the anode and the cathode, means for rotating the drum cathode at a uniform rate, sensing means arranged to provide in use an output indicative of the temperature of the non-immersed portion of the titanium surface adjacent entry into the electrolyte, heating means responsive to the output of the sensing means for heating the drum cathode to maintain the sensed temperature at a predetermined value, means for maintaining an electrolyte at a predetermined temperature, a source of electrical current connected to the anode and cathode and being arranged to supply a predetermined electrolyzing current, means for maintaining the temperature of the anode at a predetermined value, and means for stripping the deposited foil from the cathode.

2. An electrodeposition apparatus according to claim 1 wherein said heating means comprises electrical heaters mounted inside the drum cathode.

3. An electrodeposition apparatus according to claim 1 including means engaging the cathode surface so as to delineate the width of foil deposited on the cathode.

4. An electrodeposition apparatus according to claim 1 wherein the means for maintaining the electrolyte flow comprises a head of electrolyte which is set at a predetermined level by means of an adjustable weir.

5. An electrodeposition apparatus for producing iron foil, and comprising a drum cathode arranged for rotation about a horizontal axis and having its cylindrical surface formed of titanium, a carbon anode having its operative surface uniformly spaced from the cylindrical surface of the cathode and extending around a portion thereof thereby forming an arcuate gap, a ferrous electrolyte within the arcuate gap, means for maintaining a uniform rate of laminar flow at the ferrous electrolyte around the arcuate gap between the anode and the cathode, means for rotating the drum cathode at a uniform rate, sensing means arranged to provide in use an output indicative of the temperature of the non-immersed portion of the titanium surface adjacent entry into the ferrous electrolyte, heating means responsive to the output of the sensing means for heating the drum cathode to maintain the sensed temperature at a predetermined value, means for maintaining the ferrous electrolyte at a predetermined temperature, a source of electrical current connected to the anode and cathode and being arranged to supply a predetermined electrolyzing current, means for maintaining the temperature of the anode at a predetermined value, and means for stripping the deposited iron foil from the cathode.

6. An electrodeposition apparatus comprising a drum cathode arranged for rotation about a horizontal axis and having its cylindrical surface formed of titanium, a carbon anode having its operative surface uniformly spaced from the cylindrical surface of the cathode and extending around a portion thereof thereby forming an arcuate gap, means for maintaining a uniform rate of laminar flow of electrolyte around the arcuate gap between the anode and the cathode, means for rotating the drum cathode at a uniform rate, a temperature sensor in contact with a non-immersed portion of the cathode surface adjacent its entry into the electrolyte and providing an electrical output signal, a plurality of electrical heaters disposed internally of the drum cathode, an electrical power supply responsive to the output signal from the temperature sensor for energizing the heaters such that the sensed temperature is maintained at a predetermined value, means for maintaining an electrolyte at a predetermined temperature, a source of electrical current connected to the anode and cathode and being arranged to supply a predetermined electrolyzing current, means for maintaining the temperature of the anode at a predetermined value, means for stripping the foil from the cathode, and means engaging the cathode surface so as to delineate the width of foil deposited on the cathode.

* * * * *